United States Patent
Nishigaki et al.

(10) Patent No.: US 8,420,559 B2
(45) Date of Patent: *Apr. 16, 2013

(54) MULTILAYER CERAMIC CAPACITOR

(75) Inventors: Masahiro Nishigaki, Kagoshima (JP); Hideyuki Osuzu, Kirishima (JP); Jun Ueno, Kagoshima (JP); Hiroaki Mino, Kagoshima (JP)

(73) Assignee: Kyocera Corporation, Kyoto (JP)

( * ) Notice: Subject to any disclaimer, the term of this patent is extended or adjusted under 35 U.S.C. 154(b) by 308 days.

This patent is subject to a terminal disclaimer.

(21) Appl. No.: 12/934,635

(22) PCT Filed: Mar. 24, 2009

(86) PCT No.: PCT/JP2009/055867
§ 371 (c)(1),
(2), (4) Date: Sep. 24, 2010

(87) PCT Pub. No.: WO2009/119614
PCT Pub. Date: Oct. 1, 2009

(65) Prior Publication Data
US 2011/0019334 A1   Jan. 27, 2011

(30) Foreign Application Priority Data

Mar. 24, 2008   (JP) .................................. 2008-075828

(51) Int. Cl.
*H01G 4/12* (2006.01)
*C04B 35/468* (2006.01)

(52) U.S. Cl.
USPC .......................... 501/138; 501/139; 361/321.4

(58) Field of Classification Search .................. 501/138, 501/139; 361/321.4
See application file for complete search history.

(56) References Cited

U.S. PATENT DOCUMENTS

| | | | |
|---|---|---|---|
| 6,226,172 B1 | 5/2001 | Sato et al. | |
| 6,809,052 B2 * | 10/2004 | Horie et al. | 501/138 |
| 8,059,388 B2 * | 11/2011 | Yamazaki et al. | 361/321.4 |
| 8,203,825 B2 * | 6/2012 | Azuma et al. | 361/313 |
| 8,208,240 B2 * | 6/2012 | Yamazaki et al. | 361/321.4 |
| 2001/0035563 A1 | 11/2001 | Masumiya et al. | |
| 2003/0158032 A1 | 8/2003 | Fujikawa et al. | |
| 2006/0114641 A1 | 6/2006 | Iwasaki et al. | |

FOREIGN PATENT DOCUMENTS

| | | | |
|---|---|---|---|
| JP | 2000-154057 A | 6/2000 | |
| JP | 2001-031467 A | 2/2001 | |
| JP | 2001-135544 A | 5/2001 | |
| JP | 2001-220224 A | 8/2001 | |
| JP | 2001-345230 A | 12/2001 | |
| JP | 2006-156450 A | 6/2006 | |
| JP | 2007-258661 A | 10/2007 | |
| JP | 2009016775 | * | 2/2009 |

* cited by examiner

Primary Examiner — Karl Group
(74) Attorney, Agent, or Firm — Birch Stewart Kolasch & Birch, LLP

(57) ABSTRACT

Disclosed is a multilayer ceramic capacitor which is formed by alternately laminating (i) dielectric layers composed of a dielectric ceramic and (ii) internal electrode layers. The dielectric ceramic is composed of crystal grains mainly composed of barium titanate, while containing predetermined amounts of magnesium, vanadium, manganese and terbium, and at least one rare earth element selected from yttrium, dysprosium, holmium and erbium. In an x-ray diffraction chart of the dielectric ceramic, the diffraction intensity of the (200) plane indicating cubic barium titanate is higher than the diffraction intensity of the (002) plane indicating tetragonal barium titanate. The dielectric ceramic has a Curie temperature of 110-120° C.

4 Claims, 4 Drawing Sheets

MULTILAYER CERAMIC CAPACITOR

This application is the National Stage entry of International Application No. PCT/JP2009/055867 filed on Mar. 24, 2009, which claims priority under 35 USC §119 of Japanese Application No. JP2008-075826 filed on Mar. 24, 2008.

TECHNICAL FIELD

The present invention relates to a multilayer ceramic capacitor and particularly relates to a small-size and high-capacity multilayer ceramic capacitor containing, as dielectric layers, dielectric ceramics containing barium titanate as the main ingredients.

BACKGROUND ART

In recent years, with the spread of mobile devices, such as cellular phones, or with an increase in the speed or the enhancement in the frequency of semiconductor devices, which are main components of personal computers, multilayer ceramic capacitors to be mounted on such electronic devices have been increasingly desired to reduce the size and increase the capacity, and dielectric layers constituting the multilayer ceramic capacitors have been desired to reduce the layer thickness and increase the number of layers.

Hitherto, dielectric materials containing barium titanate as the main ingredients have been used as dielectric ceramics serving as dielectric layers constituting multilayer ceramic capacitors. However, in recent years, dielectric ceramics containing crystal grains having a so-called core shell structure has been developed in which oxide powder of magnesium or rare earth elements are added to barium titanate powder to form a solid solution of the magnesium or the rare earth elements near the surface of the crystal grains containing barium titanate as the main ingredients and has been put into practical use as a multilayer ceramic capacitor.

Here, the core shell structure of crystal grains refers to a structure in which a core portion which is a the center of the crystal grains and a shell portion which is the outer shell portion of the crystal grains form phases that are physically and chemically different from each other. In the crystal grains containing barium titanate as the main ingredients, the core portion is occupied by a tetragonal crystal phase and, in contrast, the shell portion is occupied by a cubic crystal phase.

The multilayer ceramic capacitor containing, as dielectric layers, the dielectric ceramics constituted by the crystal grains having such a core shell structure has characteristics such that, with an increase in the relative dielectric constant, X7R (the temperature change ratio of relative dielectric constant based on 25° C. is within ±15% at −55 to 125° C.) is satisfied as temperature characteristics of relative dielectric constant and the change in the relative dielectric constant when increasing an AC voltage to be applied is small. However, when the dielectric layer thickness is reduced to about 2 μm, for example, there has been a problem in that the life characteristics in a high temperature load test sharply decrease.

[Patent-Document 1] Japanese Unexamined Patent Application Publication No. 2001-220224

DISCLOSURE OF INVENTION

Problems to be Solved by the Invention

It is a principal object of the present invention to provide a multilayer ceramic capacitor containing dielectric layers in which the dielectric constant is high, the stability of the temperature characteristics of relative dielectric constant is good, an increase in the relative dielectric constant when the AC voltage is increased is small, and the life characteristics in a high temperature load test are good.

Advantages

The present invention can provide a multilayer ceramic capacitor containing dielectric layers in which the dielectric constant is high, the temperature change ratio of relative dielectric constant can be made small, an increase in the relative dielectric constant when the AC voltage to be applied is made high is small (low AC voltage dependence of relative dielectric constant), and the life in a high temperature load test is good.

BRIEF DESCRIPTION OF DRAWINGS

FIG. 1 is a schematic cross sectional view showing an example of a multilayer ceramic capacitor of the invention.

FIG. 2 is an enlarged view of a dielectric layer constituting the multilayer ceramic capacitor of FIG. 1 and is a schematic view showing crystal grains and a grain boundary phase.

FIG. 3 is an X ray diffraction chart of a sample No. I-3 in Examples.

FIG. 4 is a graph showing the temperature characteristics of the electrostatic capacity of the sample No. I-3 in Examples.

Figure 1:
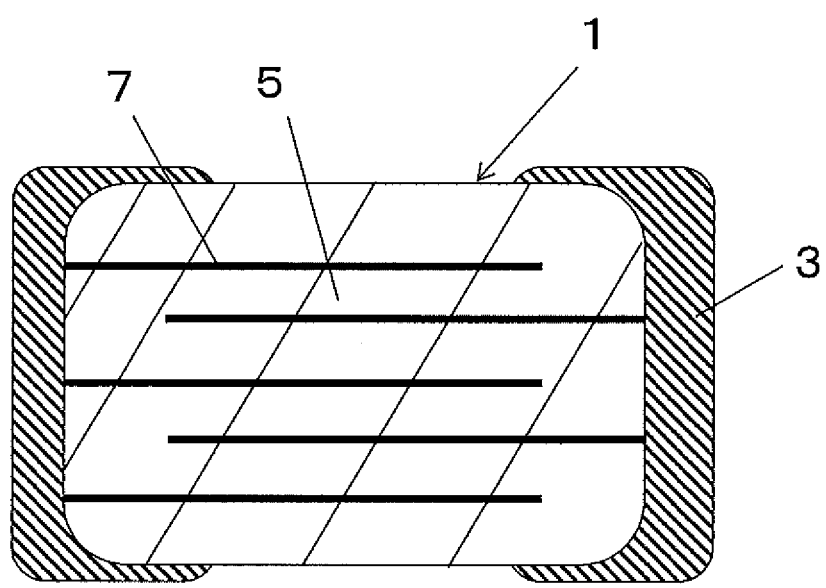
[FIG. 1]

| Reference Numerals | |
|---|---|
| 1 | Capacitor main body |
| 3 | External electrode |
| 5 | Dielectric layer |
| 7 | Internal electrode layer |
| 9 | Crystal grains |
| 11 | Grain boundary phase |

BEST MODES FOR CARRYING OUT THE INVENTION

Figure 2:
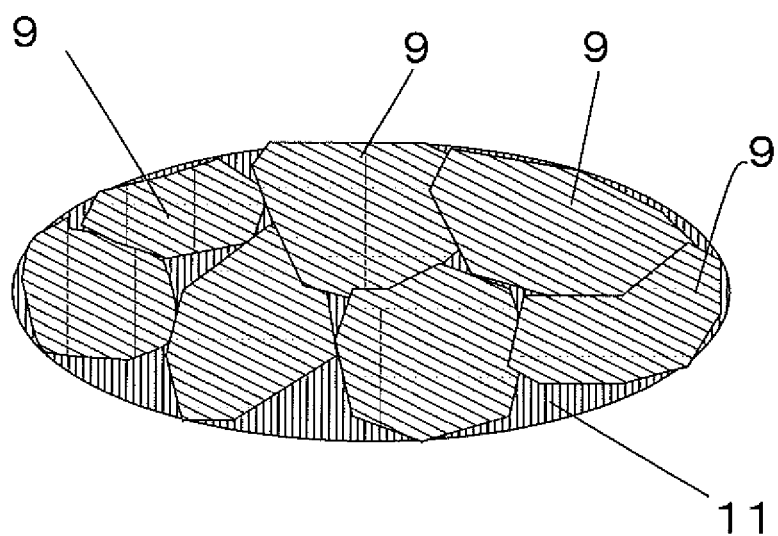
[FIG. 2]

The multilayer ceramic capacitor of the invention will be described in detail based on the schematic cross sectional view of FIG. 1. FIG. 1 is a schematic cross sectional view showing an example of a multilayer ceramic capacitor of the invention. FIG. 2 is an enlarged view of a dielectric layer constituting the multilayer ceramic capacitor of FIG. 1 and is a schematic view showing crystal grains and a grain boundary phase.

In the multilayer ceramic capacitor of the invention, external electrodes 3 are formed at both ends of the capacitor main body 1. The external electrodes 3 are formed by printing Cu or an alloy paste of Cu and Ni, for example.

The capacitor main body 1 is constituted by alternately laminating dielectric layers 5 containing dielectric ceramics and internal electrode layers 7. In FIG. 1, a laminated state of the dielectric layers 5 and the internal electrode layers 7 is simplified. The multilayer ceramic capacitor of the invention is a laminate containing hundreds of the dielectric layers 5 and the internal electrode layers 7.

The dielectric layer 5 containing dielectric ceramics is constituted by crystal grains 9 and a grain boundary phase 11. The thickness thereof is preferably 2 μm or lower and particularly preferably 1 μm or lower. Thus, a reduction in the size and an increase in the capacity of the multilayer ceramic capacitor can be achieved. When the thickness of the dielectric layers 5 is 0.4 μm or more, variation in the electrostatic capacity can be made small and the capacity temperature characteristics can be stabilized.

For the internal electrode layers 7, base metals, such as nickel (Ni) or copper (Cu), are preferable in terms that the manufacturing cost can be suppressed even when the number of layers is increased. In particular, in terms that simultaneous firing with the dielectrics layer 5 in the invention can be achieved, nickel (Ni) is more preferable.

The dielectric ceramics constituting the dielectric layers 5 in the multilayer ceramic capacitor of the invention is constituted by crystal grains containing barium titanate as the main ingredients and contains a sintered compact containing magnesium, vanadium, manganese, terbium, and at least one rare earth element selected from yttrium, dysprosium, holmium, and erbium.

The sintered compact contains, with respect to 100 mol of titanium constituting the barium titanate, 0.02 to 0.2 mol of vanadium in terms of $V_2O_5$, 0.2 to 0.8 mol of magnesium in terms of MgO, 0.1 to 0.5 mol of manganese in terms of MnO, 0.3 to 0.8 mol of at least one rare earth element (RE) selected from yttrium, dysprosium, holmium, and erbium in terms of $RE_2O_3$, and 0.02 to 0.2 mol of terbium in terms of $Tb_4O_7$. The RE is an abbreviation of rare earth elements.

In the dielectric ceramics constituting the dielectric layers 5 in the multilayer ceramic capacitor of the invention, the diffraction intensity at the angle of the diffraction peak of the (200) plane showing a cubic barium titanate is larger than the diffraction intensity at the angle of the diffraction peak of the (002) plane showing a tetragonal barium titanate in the X ray diffraction chart of the dielectric ceramics and the curie temperature is 110 to 120° C.

Thus, a high-reliable multilayer ceramic capacitor can be obtained in which the relative dielectric constant at room temperature (25° C.) is 3300 or more, the dielectric loss is 12% or lower, the temperature characteristics of relative dielectric constant satisfy X6S (the temperature change ratio of relative dielectric constant based on 25° C. is within ±22% at −55 to 105° C.), the relative dielectric constant when the AC voltage is 1 V is not more than 1.7 times the relative dielectric constant when the AC voltage is 0.01 V, and defects do not occur in a high temperature load test (Temperature: 105° C., Voltage: 1.5 times the rated voltage, Test time: 1000 hours).

More specifically, in case where the content of vanadium is lower than 0.02 mol in terms of $V_2O_5$ with respect to 100 mol of titanium constituting barium titanate, the reliability in a high temperature load test decreases. In contrast, in case where the content of vanadium is more than 0.2 mol in terms of $V_2O_5$, the relative dielectric constant at room temperature is low.

In case where the content of magnesium is lower than 0.2 mol in terms of MgO with respect to 100 mol of titanium constituting barium titanate, the temperature characteristics of relative dielectric constant considerably deviate to the + side and the conditions of X6S which are the temperature characteristics of electrostatic capacity are not satisfied. In contrast, in case where the content of magnesium is more than 0.8 mol, the curie temperature becomes lower than 110° C. and the relative dielectric constant at room temperature is low.

In case where the content of manganese is lower than 0.1 mol in terms of MnO with respect to 100 mol of titanium constituting barium titanate, the insulation resistance of the dielectric layers 5 decrease, and thus, also in this case, the reliability in a high temperature load test decreases. In contrast, in case where the content of manganese is more than 0.5 mol in terms of MnO, the relative dielectric constant at room temperature becomes low.

In case where the content of at least one rare earth element selected from yttrium, dysprosium, holmium, and erbium is lower than 0.3 mol in terms of $RE_2O_3$ with respect to 100 mol of titanium constituting barium titanate, the reliability in a high temperature load test decreases also in this case. In contrast, in case where the content of the rare earth element is more than 0.8 mol in terms of $RE_2O_3$, the relative dielectric constant at room temperature decreases.

In case where the content of terbium is lower than 0.02 mol in terms of $Tb_4O_7$ with respect to 100 mol of titanium constituting barium titanate, the solid solution amount of vanadium, magnesium, manganese, and rare earth elements to barium titanate as the main ingredients becomes small and the curie temperature of the dielectric ceramics becomes equivalent to the curie temperature (about 125° C.) of barium titanate exhibiting the core shell structure. Thus, also in this case, the reliability in a high temperature load test decreases. In contrast, in case where the content of terbium is more than 0.2 mol in terms of $Tb_4O_7$, the solid solution amount of vanadium, magnesium, manganese, and rare earth elements to barium titanate as the main ingredients increases. Therefore, as compared with the relative dielectric constant when the AC voltage is 0.01 V, the relative dielectric constant when the AC voltage is 1 V increases (high AC voltage dependence of relative dielectric constant) and the change in the electrostatic capacity when the rated voltage changes becomes large.

A particularly preferable composition contains, with respect to 100 mol of titanium constituting barium titanate, 0.02 to 0.08 mol of vanadium in terms of $V_2O_5$, 0.3 to 0.6 mol of magnesium in terms of MgO, 0.2 to 0.4 mol of manganese in terms of MnO, 0.4 to 0.6 mol of at least one rare earth element (RE) selected from yttrium, dysprosium, holmium, and erbium, in terms of $RE_2O_3$, and 0.02 to 0.08 mol of terbiums in terms of $Tb_4O_7$.

With the dielectric ceramics containing the elements in the ranges above, the relative dielectric constant at room temperature can be raised to 3800 or more and the relative dielectric constant when the AC voltage is 1 V can be adjusted to be not less than 1.4 times the relative dielectric constant when the AC voltage is 0.01 V. As the rare earth element, yttrium is particularly preferable in terms that a higher dielectric constant is obtained and the insulation resistance is high.

Figure 3:
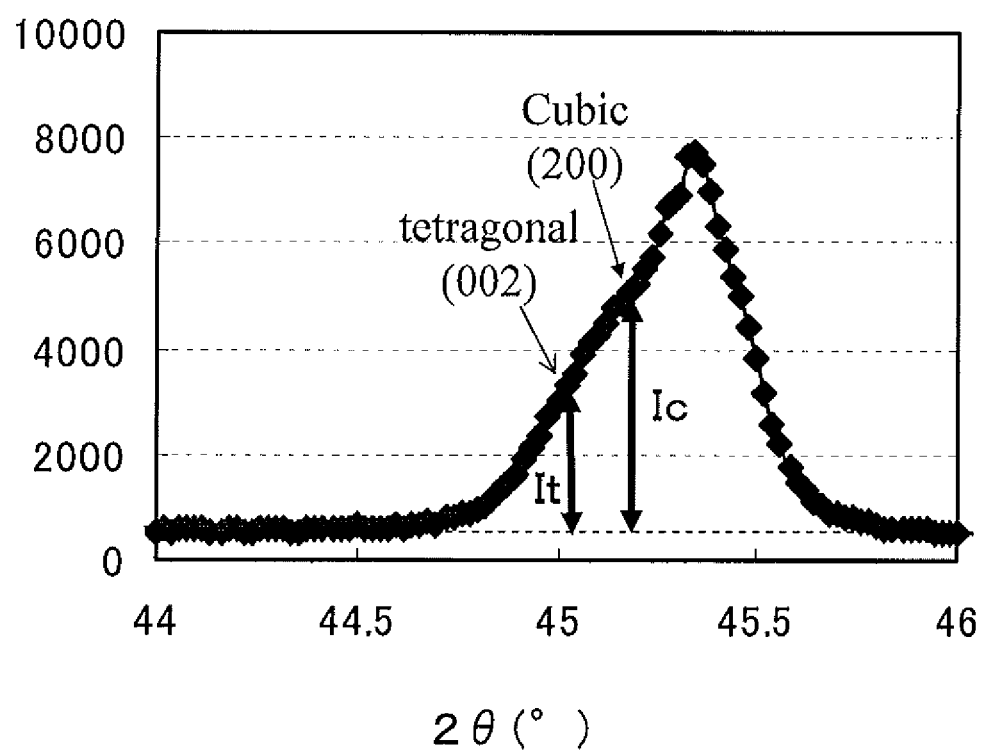
[FIG. 3]
Figure 4:
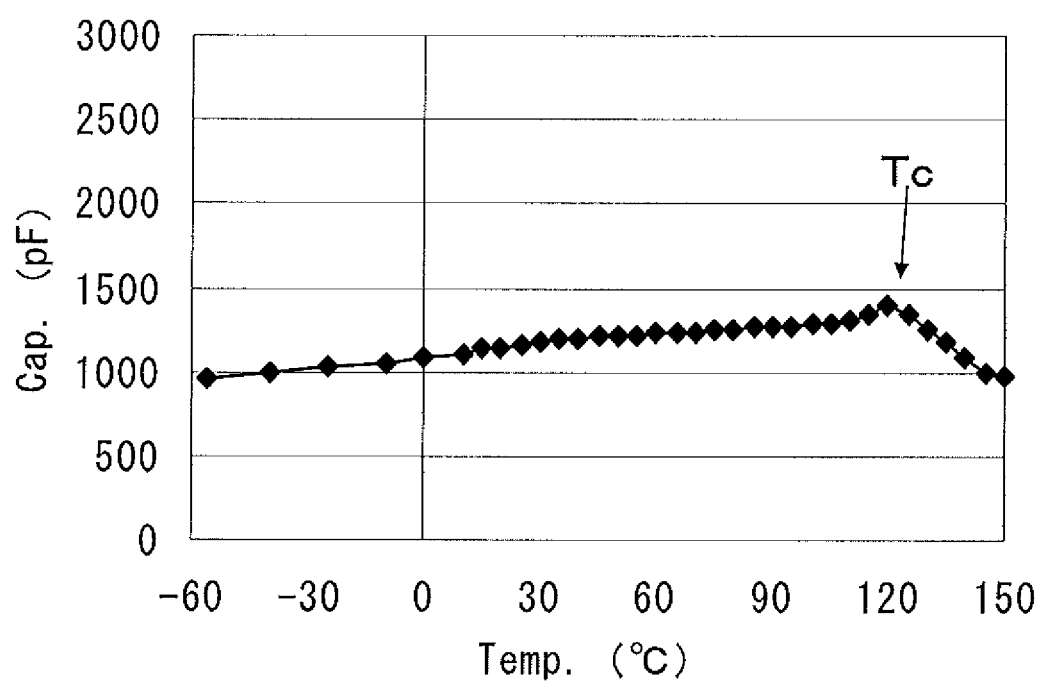
[FIG. 4]

FIG. 3 shows an X ray diffraction chart of dielectric ceramics constituting a multilayer ceramic capacitor of a sample No. I-3 in Tables 1 to 3 in Examples described later. The dielectric ceramics constituting the multilayer ceramic capacitor of the invention has a diffraction pattern as shown in the X ray diffraction chart of FIG. 3. FIG. 4 is a graph showing the temperature characteristics of electrostatic capacity of the multilayer ceramic capacitor of the sample No. I-3 in Tables 1 to 3 in Examples described later. The multilayer ceramic capacitor of the invention has the temperature characteristics of electrostatic capacity as shown in FIG. 4.

In the X ray diffraction chart of FIG. 3, the X ray diffraction peak of the (200) plane (around 2θ=45.3°) showing a cubic barium titanate and the X ray diffraction peak of the (002) plane (around 2θ=45.1°) showing a tetragonal barium titanate are overlapped to form a wide diffraction peak, in which the diffraction intensity (Ic) of the (200) plane showing a cubic barium titanate is larger than the diffraction intensity (It) of the (002) plane showing a tetragonal barium titanate. The crystal structure is similar to the X ray diffraction pattern of a former core shell structure. However, as shown in FIG. 4, the dielectric ceramics constituting the multilayer ceramic capacitor of the invention has a curie temperature (Tc) of 110 to 120° C. and has dielectric properties different from that of a dielectric ceramics having a former core shell structure having a curie temperature of 125° C.

More specifically, dielectric ceramics having a core shell structure obtained by forming a solid solution of added ingredients, such as magnesium, manganese, and rare earth elements, to barium titanate as the main ingredients exhibits a curie temperature around the curie temperature (125° C.) of pure barium titanate. In contrast, the dielectric ceramics constituting the dielectric layers 5 in the multilayer ceramic capacitor of the invention forms a solid solution of vanadium, magnesium, manganese, at least one rare earth element selected from yttrium, dysprosium, holmium, and erbium, and terbium to barium titanate. Therefore, although the dielectric ceramics has a crystal structure in which, in the X ray diffraction chart, the diffraction intensity of the (200) plane showing a cubic barium titanate is larger than the diffraction intensity of the (002) plane showing a tetragonal barium titanate, the curie temperature has shifted to the room temperature side, i.e., 110 to 120° C.

This is because the added ingredients are diffused to the inside of the dielectric ceramics by forming a solid solution of a slight amount of terbium in addition to the added ingredients, such as vanadium, magnesium, manganese, and rare earth elements. Therefore, the structure seems to be the core shell structure from the X ray diffraction pattern, but the curie temperature can be set to 110 to 120° C.

In the multilayer ceramic capacitor of the invention, the diffused elements compensate oxygen defects in the crystal grains 9, which increases the insulation properties of the dielectric ceramics, and thus the life in a high temperature load test can be increased.

More specifically, in case where the solid solution amount of magnesium or rare earth elements is small in the crystal grains, the proportion of the core portion including many defects, such as an oxygen hole, increases. Thus, it is considered that when a direct-current voltage is applied, the oxygen hole or the like easily becomes a charge carrying career in the crystal grains 9 constituting the dielectric ceramics, and the insulation properties of the dielectric ceramics decrease. However, in the dielectric ceramics constituting the dielectric layers 5 in the multilayer ceramic capacitor of the invention, terbium is added with vanadium to increase the solid solution of the added ingredients containing the same and the curie temperature is set in the range of 110 to 120° C. Therefore, the carrier density of the oxygen hole or the like in the crystal grains 9 is reduced, a large amount of rare earth elements or magnesium is contained, and the number of oxygen holes in the crystal grains 9 can be made small. Thus, it is considered that high insulation properties can be obtained.

In the dielectric ceramics constituting the dielectric layer 5 in the multilayer ceramic capacitor of the invention, the average crystal grain diameter of the crystal grains 9 may be 0.1 μm or more in terms that a high dielectric constant can be achieved. In order to reduce the variation of the electrostatic capacity, the diameter may be in the range of 0.3 μm or lower. The average crystal grain diameter of the crystal grains 9 is preferably 0.22 to 0.28 μm or 0.13 to 0.19 μm.

In case where the average crystal grain diameter of the crystal grains 9 is 0.22 to 0.28 μm, there are advantages in that the relative dielectric constant is 3300 or more, the dielectric loss is 11% or lower, the temperature characteristics of relative dielectric constant satisfy X6S (the temperature change ratio of relative dielectric constant based on 25° C. is within ±22% at −55 to 105° C.), the relative dielectric constant when the AC voltage is 1 V is not more than 1.7 times the relative dielectric constant when the AC voltage is 0.01 V, and the reliability in a high temperature load test (Temperature: 105° C., Voltage: 1.5 times the rated voltage, Test time: 1000 hours) can be satisfied.

Moreover, the invention has an advantage in that when the average crystal grain diameter of the crystal grains 9 is 0.13 to 0.19 μm, the conditions (e.g., Temperature: 125° C., Voltage: 1.5 times the rated voltage, Test time: 1000 hours) in a severer high temperature load test can be satisfied. In order to adjust the average crystal grain diameter of the crystal grains 9, the specific surface area of barium titanate powder (BT powder) which is a raw material powder as described later may be adjusted, for example.

Here, the average crystal grain diameter of the crystal grains 9 constituting the dielectric layers 5 is determined as follows. First, the fracture surface of the sample which is the capacitor main body 1 after firing is polished, and then a photograph of the internal composition is taken using a scanning electron microscope. Then, a circle including 20 to 30 pieces of the crystal grains 9 is drawn on the photograph, the crystal grains 9 inside the circle and on the circumference are selected, image processing of the outline of each crystal grain 9 is carried out, and then the area of each grain is determined. Then, the diameter when replaced with a circle having the same area as that of the above-described circle is calculated to determine the average crystal grain diameter of the crystal grains 9 from the average value.

The dielectric ceramics of the invention may contain glass ingredients as an auxiliary agent for improving sintering properties insofar as desired dielectric properties can be maintained.

Next, a method for manufacturing the multilayer ceramic capacitor of the invention will be described. First, $V_2O_5$ powder and MgO powder and further oxide powder of at least one rare earth element selected from $Y_2O_3$ powder, $Dy_2O_3$ powder, $Ho_2O_3$ powder, and $Er_2O_3$ powder, $Tb_4O_7$ powder, and $MnCO_3$ powder are added to and mixed, as raw material powder, with to barium titanate powder having a purity of 99% or more (hereinafter referred to as BT powder).

The BT powder to be used preferably has a specific surface area of 2 to 6 $m^2/g$. When the specific surface area of the BT powder is 2 to 6 $m^2/g$, the curie temperature is easily shifted to the low temperature side by forming a solid solution of the added ingredients in the crystal grains 9 while the crystal grains 9 maintaining the crystal structure close to the core shell structure. Moreover, the relative dielectric constant can be improved and the insulation properties of the dielectric ceramics can be improved, and thus the reliability in a high temperature load test can be improved. In the invention, in order to adjust the average crystal grain diameter of the crystal grains 9 constituting the dielectric ceramics to be 0.19 μm or lower, it is preferable to select powder having a specific surface area larger than 5 $m^2/g$.

The oxide powder of at least one rare earth element selected from $Y_2O_3$ powder, $Dy_2O_3$ powder, $Ho_2O_3$ powder, and $Er_2O_3$ powder, $Tb_4O_7$ powder, $V_2O_5$ powder, MgO powder, and $MnCO_3$ powder, which are additive agents, having the same grain size (or specific surface area) as that of the dielectric powder are preferably used.

Subsequently, the raw material powders are blended in the following proportions: 0.02 to 0.2 mol of $V_2O_5$ powder, 0.2 to 0.8 mol of MgO powder, 0.3 to 0.8 mol of oxide powder of a rare earth element, 0.1 to 0.5 mol of $MnCO_3$, and 0.02 to 0.2 mol of $Tb_4O_7$ powder with respect to 100 mol of BT powder, and further glass powder as a sintering aid is added as required insofar as desired dielectric properties can be maintained, thereby obtaining a base raw material powder. The added amount of the glass powder is preferably 0.5 to 2 parts by mass based on 100 parts by mass of the BT powder.

Subsequently, an organic vehicle for exclusive use is added to the base raw material powder to prepare a ceramic slurry. Then, a ceramic green sheet is formed using sheet forming methods, such as a doctor blade method and a die coater method. In this case, the thickness of the ceramic green sheet is preferably 0.5 to 3 µm in terms of maintaining a reduced layer thickness and high insulation properties for increasing the capacity of the dielectric layer 5.

Next, a rectangular internal electrode pattern is printed and formed on the principal surface of the obtained ceramic green sheet. For a conductive paste serving as the internal electrode pattern, Ni, Cu, or alloy powder thereof is suitable.

Next, a desired number of the ceramic green sheets on which the internal electrode pattern is formed are laminated. Then, some ceramic green sheets on which the internal electrode pattern is not formed are laminated on and under the laminated ceramic green sheets so that the number of the upper layers and the number of the lower layers are the same, thereby forming a sheet laminate. In this case, the internal electrode patterns in the sheet laminate are shifted by the half pattern in the longitudinal direction.

Next, the sheet laminate is cut in the shape of a lattice to form a capacitor main body compact so that the ends of the internal electrode patterns are exposed. By such a lamination method, the capacitor main body compact can be formed so that the internal electrode patterns are alternately exposed to the end surface of the capacitor main body compact after cutting.

Next, the capacitor main body compact is degreased and then fired. The firing temperature is preferably 1100 to 1200° C. so as to control the formation of the solid solution of the additive agents to the BT powder and the grain growth of the crystal grains in the invention. In order to obtain the dielectric ceramics of this embodiment, the BT powder having a specific surface area of 2 to 6 $m^2/g$ is used and, to the powder, various kinds of oxide powder of magnesium, manganese, and at least one rare earth element selected from yttrium, dysprosium, holmium, and erbium and oxides of vanadium and terbium are added as additive agents in the given proportions as described above, and then the mixture is fired at the above-mentioned temperature. Thus, various kinds of additive agents are blended in the crystal grains obtained using the BT powder as the main raw material to make the crystal structure of the crystal grains 9 close to the core shell structure and also the curie temperature is adjusted to be lower than the curie temperature of the dielectric ceramics exhibiting a former core shell structure. By firing so that the curie temperature after firing is lower than the curie temperature of the dielectric ceramics exhibiting a former core shell structure, the formation of the solid solution of the additive agents is increased in the crystal grains 9. As a result, dielectric ceramics having high insulation properties and good life in a high temperature load test is obtained.

After firing, heat treatment is performed again in a weak reduction atmosphere. This heat treatment is performed for re-oxidizing the dielectric ceramics that has been reduced in the firing in a reduction atmosphere to recover the insulation resistance that has decreased due to reduction when fired. The firing temperature is preferably 900 to 1100° C. so as to increase the re-oxidization amount while suppressing the grain growth of the crystal grains 9. Thus, the insulation properties of the dielectric ceramics are increased, and thus a multilayer ceramic capacitor exhibiting a curie temperature of 110 to 120° C. can be produced.

Next, an external electrode paste is applied to the facing ends of the capacitor main body 1 and printed, thereby forming the external electrodes 3. In order to increase the mounting properties, a plating film may be formed on the surface of the external electrodes 3.

EXAMPLES

Hereinafter, the invention will be described in detail with reference to Examples, but is not limited to the following Examples.

Example I

First, BT powder, MgO powder, $Y_2O_3$ powder, $Dy_2O_3$ powder, $Ho_2O_3$ powder, $Er_2O_3$ powder, $Tb_4O_7$ powder, $MnCO_3$ powder, and $V_2O_5$ powder were prepared as raw material powders. The powders were mixed in the proportions shown in Table 1. The proportions of the MgO powder, the $Y_2O_3$ powder, the $Dy_2O_3$ powder, the $Ho_2O_3$ powder, the $Er_2O_3$ powder, the $Tb_4O_7$ powder, the $MnCO_3$ powder, and the $V_2O_5$ powder are with respect to 100 mol of the BT powder. All the raw material powders had a purity of 99.9% and the BT powder having a specific surface area of 4 $m^2/g$ was used. The MgO powder, the $Y_2O_3$ powder, the $Dy_2O_3$ powder, the $Ho_2O_3$ powder, the $Er_2O_3$ powder, the $Tb_4O_7$ powder, the $MnCO_3$ powder, and the $V_2O_5$ powder having an average grain diameter of 0.1 µm were used. As the sintering aid, glass powder having a composition of $SiO_2$=55, BaO=20, CaO=15, and $Li_2O$=10 (mol %) was used. The added amount of the glass powder was 1 part by mass based on 100 parts by mass of the BT powder.

Next, a mixed solvent of toluene and alcohol was added as a solvent to the raw material powders, and then the mixture was subjected to wet-mixing using a zirconia ball having a diameter of 5 mm.

The wet-mixed powder was put in a mixed solvent of polyvinyl butyral resin and toluene and alcohol, and the mixture was subjected to wet-mixing using a zirconia ball having a diameter of 5 mm to prepare a ceramic slurry. Then, ceramic green sheets having a thickness of 1.5 µm and 2.5 µm were produced by a doctor blade method.

A plurality of rectangular internal electrode patterns containing Ni as the main ingredient were formed on the upper surface of the 1.5 µm thick and 2.5 µm thick ceramic green sheets. As the conductive paste for forming the internal electrode pattern, a substance was used in which a slight amount of BT powder was added to 100 parts by mass of Ni powder having an average grain diameter of 0.3 µm.

Next, 200 ceramic green sheets on which the internal electrode pattern was printed were laminated, 20 ceramic green sheets on which the internal electrode pattern was not printed were laminated on each of the upper and lower surfaces. Then, the ceramic green sheets were stuck to each other using a pressing machine under the conditions of a temperature of 60° C., a pressure of $10^7$ Pa, and a period of time of 10 minutes, thereby producing a laminate using the 1.5 µm thick ceramic green sheets and a sheet laminate using the 2.5 µm thick ceramic green sheets. After an appropriate time, each sheet laminate was cut into a given size, thereby forming a capacitor main body compact.

Next, the capacitor main body compact was subjected to binder-removal treatment in the atmosphere, and fired for 2 hours at 1120 to 1135° C. in hydrogen-nitrogen, thereby producing a capacitor main body. A sample was continuously subjected to re-oxidation treatment at 1000° C. for 4 hours in a nitrogen atmosphere. The size of the capacitor main body was 0.95×0.48×0.48 mm³, the thickness of the dielectric layer was 1 μm or 2 μm, and the effective area of one internal electrode layer was 0.3 mm². The effective area refers to an area of a portion where the internal electrode layers alternately formed in the lamination direction in such a manner as to be exposed to the different end surfaces of the capacitor main body were overlapped.

The fired capacitor main body was subjected to barrel polishing, and then an external electrode paste containing Cu powder and glass was applied to both ends of the capacitor main body and printed at 850° C., thereby forming external electrodes. Thereafter, the surface of the external electrodes was successively subjected to Ni plating and Sn plating using an electrolytic barrel machine, thereby producing a multilayer ceramic capacitor.

Next, the multilayer ceramic capacitors were subjected to the following evaluations. In each evaluation, the number of the samples was 10, and the evaluation was performed from the average value.

The relative dielectric constant and the dielectric loss were determined from the thickness of the dielectric layer and the effective area of the internal electrode layer by measuring the electrostatic capacity at a temperature of 25° C., a frequency of 1.0 kHz, and a measurement voltage of 0.01 Vrms or 1 Vrms. The temperature characteristics of relative dielectric constant were determined by measuring the electrostatic capacity in a temperature range of −55 to 150° C. The case where the temperature characteristics of relative dielectric constant satisfy X6S (within ±22% based on 25° C. in the range of −55 to 105° C.) was evaluated as O and the case where the temperature characteristics of relative dielectric constant do not satisfy X6S was evaluated as x. The curie temperature was determined as a temperature at which the relative dielectric constant is the maximum in the range where the temperature characteristics of relative dielectric constant were measured.

The high temperature load test was performed under the conditions of a temperature of 105° C., an applied voltage of 6 V/μm, and a period of time of 1000 hours. The number of the samples in the high temperature load test was 20 for each sample, and the samples having no defects until 1000 hours passed were evaluated as non-defective samples.

The average crystal grain diameter of the crystal grains constituting the dielectric layer was determined as follows: the fracture surface of the sample as the capacitor main body after firing was polished, a photograph of the internal structure was taken using a scanning electron microscope, a circle including 20 to 30 crystal grains was drawn on the photograph, the crystal grains in the circle and on the circumference were selected, image processing of the outline of each crystal grain was carried out, the area of each grain was determined, and the diameter when replaced with a circle having the same area as that of the above-described circle was calculated, and then the average crystal grain diameter of the crystal grains was determined from the average value.

The ratio of the diffraction intensity of the (200) plane showing a cubic barium titanate and the diffraction intensity of the (002) plane showing a tetragonal barium titanate was measured using an X ray diffraction device having a Cuκα vessel in the range of Angle 2θ=44 to 46°, and then determined from the peak intensity ratio.

The composition of the sample as the obtained sintered compact was analyzed by ICP (Inductively Coupled Plasma) analysis or atomic absorption analysis. In this case, the obtained dielectric ceramics was mixed with boric acid and sodium carbonate and melted, and then dissolved in hydrochloric acid, and then the qualitative analysis of the elements contained in the dielectric ceramics was first performed by atomic absorption analysis. Subsequently, each specified element was subjected to ICP emission spectrochemical analysis and quantified using a diluted standard liquid as a standard sample. The oxygen amount was determined using the valence of each element as a valence shown in the periodic table.

The formulation composition and the firing temperature are shown in Table 1, the composition of each element in a sintered compact in terms of oxide is shown in Table 2, and the measurement results of the thickness of the dielectric layer after firing, the average crystal grain diameter, the peak intensity ratio of the cubic crystal and the tetragonal crystal by X ray diffraction, the properties (dielectric constant, dielectric loss, temperature characteristics of relative dielectric constant (determined from the temperature characteristics of electrostatic capacity), and life in a high temperature load test) are shown in Table 3.

TABLE 1

| Sample No. | $V_2O_5$ Mol | MgO Mol | $MnCO_3$ Mol | $RE_2O_3$ Element | $RE_2O_3$ Mol | $Tb_4O_7$ Mol | Firing temperature ° C. |
|---|---|---|---|---|---|---|---|
| * I-1 | 0.1 | 0.5 | 0.3 | Y | 0.5 | 0 | 1130 |
| I-2 | 0.1 | 0.5 | 0.3 | Y | 0.5 | 0.05 | 1130 |
| I-3 | 0.1 | 0.5 | 0.3 | Y | 0.5 | 0.1 | 1130 |
| I-4 | 0.1 | 0.5 | 0.3 | Y | 0.5 | 0.15 | 1130 |
| I-5 | 0.1 | 0.5 | 0.3 | Y | 0.5 | 0.2 | 1130 |
| * I-6 | 0.1 | 0.5 | 0.3 | Y | 0.5 | 0.3 | 1130 |
| * I-7 | 0 | 0.5 | 0.3 | Y | 0.5 | 0.1 | 1130 |
| I-8 | 0.02 | 0.5 | 0.3 | Y | 0.5 | 0.1 | 1130 |
| I-9 | 0.05 | 0.5 | 0.3 | Y | 0.5 | 0.1 | 1130 |
| I-10 | 0.08 | 0.5 | 0.3 | Y | 0.5 | 0.1 | 1130 |
| I-11 | 0.12 | 0.5 | 0.3 | Y | 0.5 | 0.1 | 1130 |
| I-12 | 0.15 | 0.5 | 0.3 | Y | 0.5 | 0.1 | 1130 |
| I-13 | 0.2 | 0.5 | 0.3 | Y | 0.5 | 0.1 | 1130 |
| * I-14 | 0.3 | 0.5 | 0.3 | Y | 0.5 | 0.1 | 1130 |
| * I-15 | 0.1 | 0.1 | 0.3 | Y | 0.5 | 0.1 | 1130 |
| I-16 | 0.1 | 0.2 | 0.3 | Y | 0.5 | 0.1 | 1130 |
| I-17 | 0.1 | 0.3 | 0.3 | Y | 0.5 | 0.1 | 1130 |
| I-18 | 0.1 | 0.6 | 0.3 | Y | 0.5 | 0.1 | 1130 |
| I-19 | 0.1 | 0.8 | 0.3 | Y | 0.5 | 0.1 | 1130 |
| * I-20 | 0.1 | 1 | 0.3 | Y | 0.5 | 0.1 | 1130 |
| * I-21 | 0.1 | 0.5 | 0 | Y | 0.5 | 0.1 | 1130 |
| I-22 | 0.1 | 0.5 | 0.1 | Y | 0.5 | 0.1 | 1130 |
| I-23 | 0.1 | 0.5 | 0.2 | Y | 0.5 | 0.1 | 1130 |
| I-24 | 0.1 | 0.5 | 0.4 | Y | 0.5 | 0.1 | 1130 |
| I-25 | 0.1 | 0.5 | 0.5 | Y | 0.5 | 0.1 | 1130 |
| * I-26 | 0.1 | 0.5 | 0.6 | Y | 0.5 | 0.1 | 1130 |
| * I-27 | 0.1 | 0.5 | 0.3 | Y | 0.1 | 0.1 | 1130 |
| I-28 | 0.1 | 0.5 | 0.3 | Y | 0.3 | 0.1 | 1130 |
| I-29 | 0.1 | 0.5 | 0.3 | Y | 0.4 | 0.1 | 1130 |
| I-30 | 0.1 | 0.5 | 0.3 | Y | 0.6 | 0.1 | 1130 |
| I-31 | 0.1 | 0.5 | 0.3 | Y | 0.8 | 0.1 | 1130 |
| * I-32 | 0.1 | 0.5 | 0.3 | Y | 1 | 0.1 | 1130 |
| I-33 | 0.1 | 0.5 | 0.3 | Dy | 0.5 | 0.1 | 1130 |
| I-34 | 0.1 | 0.5 | 0.3 | Ho | 0.5 | 0.1 | 1130 |
| I-35 | 0.1 | 0.5 | 0.3 | Er | 0.5 | 0.1 | 1130 |
| I-36 | 0.02 | 0.5 | 0.3 | Y | 0.5 | 0.02 | 1130 |
| I-37 | 0.08 | 0.5 | 0.3 | Y | 0.5 | 0.08 | 1130 |
| I-38 | 0.05 | 0.5 | 0.3 | Y | 0.5 | 0.02 | 1130 |
| I-39 | 0.05 | 0.5 | 0.3 | Y | 0.5 | 0.05 | 1130 |
| I-40 | 0.05 | 0.5 | 0.3 | Y | 0.5 | 0.08 | 1130 |
| I-41 | 0.05 | 0.3 | 0.3 | Y | 0.5 | 0.05 | 1130 |
| I-42 | 0.05 | 0.6 | 0.3 | Y | 0.5 | 0.05 | 1130 |
| I-43 | 0.05 | 0.5 | 0.2 | Y | 0.5 | 0.05 | 1130 |
| I-44 | 0.05 | 0.5 | 0.4 | Y | 0.5 | 0.05 | 1130 |
| I-45 | 0.05 | 0.5 | 0.3 | Y | 0.4 | 0.05 | 1130 |
| I-46 | 0.05 | 0.5 | 0.3 | Y | 0.6 | 0.05 | 1130 |
| I-47 | 0.05 | 0.5 | 0.3 | Dy | 0.5 | 0.05 | 1130 |
| I-48 | 0.05 | 0.5 | 0.3 | Ho | 0.5 | 0.05 | 1130 |
| I-49 | 0.05 | 0.5 | 0.3 | Er | 0.5 | 0.05 | 1130 |
| I-50 | 0.05 | 0.5 | 0.3 | Y | 0.5 | 0.02 | 1130 |

TABLE 1-continued

| Sample No. | V$_2$O$_5$ Mol | MgO Mol | MnCO$_3$ Mol | RE$_2$O$_3$ Element | RE$_2$O$_3$ Mol | Tb$_4$O$_7$ Mol | Firing temperature ° C. |
|---|---|---|---|---|---|---|---|
| I-51 | 0.05 | 0.5 | 0.3 | Y | 0.5 | 0.05 | 1130 |
| I-52 | 0.05 | 0.5 | 0.3 | Y | 0.5 | 0.08 | 1130 |
| I-53 | 0.05 | 0.5 | 0.3 | Y | 0.5 | 0.05 | 1120 |
| I-54 | 0.05 | 0.5 | 0.3 | Y | 0.5 | 0.05 | 1125 |
| I-55 | 0.05 | 0.5 | 0.3 | Y | 0.5 | 0.05 | 1135 |

* represents a sample outside the range in the invention.

TABLE 2

| Sample No. | V$_2$O$_5$ Mol | MgO Mol | MnO Mol | RE$_2$O$_3$ Element | RE$_2$O$_3$ Mol | Tb$_4$O$_7$ Mol |
|---|---|---|---|---|---|---|
| * I-1 | 0.1 | 0.5 | 0.3 | Y | 0.5 | 0 |
| I-2 | 0.1 | 0.5 | 0.3 | Y | 0.5 | 0.05 |
| I-3 | 0.1 | 0.5 | 0.3 | Y | 0.5 | 0.1 |
| I-4 | 0.1 | 0.5 | 0.3 | Y | 0.5 | 0.15 |
| I-5 | 0.1 | 0.5 | 0.3 | Y | 0.5 | 0.2 |
| * I-6 | 0.1 | 0.5 | 0.3 | Y | 0.5 | 0.3 |
| * I-7 | 0 | 0.5 | 0.3 | Y | 0.5 | 0.1 |
| I-8 | 0.02 | 0.5 | 0.3 | Y | 0.5 | 0.1 |
| I-9 | 0.05 | 0.5 | 0.3 | Y | 0.5 | 0.1 |
| I-10 | 0.08 | 0.5 | 0.3 | Y | 0.5 | 0.1 |
| I-11 | 0.12 | 0.5 | 0.3 | Y | 0.5 | 0.1 |
| I-12 | 0.15 | 0.5 | 0.3 | Y | 0.5 | 0.1 |
| I-13 | 0.2 | 0.5 | 0.3 | Y | 0.5 | 0.1 |
| * I-14 | 0.3 | 0.5 | 0.3 | Y | 0.5 | 0.1 |
| * I-15 | 0.1 | 0.1 | 0.3 | Y | 0.5 | 0.1 |
| I-16 | 0.1 | 0.2 | 0.3 | Y | 0.5 | 0.1 |
| I-17 | 0.1 | 0.3 | 0.3 | Y | 0.5 | 0.1 |
| I-18 | 0.1 | 0.6 | 0.3 | Y | 0.5 | 0.1 |
| I-19 | 0.1 | 0.8 | 0.3 | Y | 0.5 | 0.1 |
| * I-20 | 0.1 | 1 | 0.3 | Y | 0.5 | 0.1 |
| * I-21 | 0.1 | 0.5 | 0 | Y | 0.5 | 0.1 |
| I-22 | 0.1 | 0.5 | 0.1 | Y | 0.5 | 0.1 |
| I-23 | 0.1 | 0.5 | 0.2 | Y | 0.5 | 0.1 |
| I-24 | 0.1 | 0.5 | 0.4 | Y | 0.5 | 0.1 |
| I-25 | 0.1 | 0.5 | 0.5 | Y | 0.5 | 0.1 |
| * I-26 | 0.1 | 0.5 | 0.6 | Y | 0.5 | 0.1 |
| * I-27 | 0.1 | 0.5 | 0.3 | Y | 0.1 | 0.1 |
| I-28 | 0.1 | 0.5 | 0.3 | Y | 0.3 | 0.1 |
| I-29 | 0.1 | 0.5 | 0.3 | Y | 0.4 | 0.1 |
| I-30 | 0.1 | 0.5 | 0.3 | Y | 0.6 | 0.1 |
| I-31 | 0.1 | 0.5 | 0.3 | Y | 0.8 | 0.1 |
| * I-32 | 0.1 | 0.5 | 0.3 | Y | 1 | 0.1 |
| I-33 | 0.1 | 0.5 | 0.3 | Dy | 0.5 | 0.1 |
| I-34 | 0.1 | 0.5 | 0.3 | Ho | 0.5 | 0.1 |
| I-35 | 0.1 | 0.5 | 0.3 | Er | 0.5 | 0.1 |
| I-36 | 0.02 | 0.5 | 0.3 | Y | 0.5 | 0.02 |
| I-37 | 0.08 | 0.5 | 0.3 | Y | 0.5 | 0.08 |
| I-38 | 0.05 | 0.5 | 0.3 | Y | 0.5 | 0.02 |
| I-39 | 0.05 | 0.5 | 0.3 | Y | 0.5 | 0.05 |
| I-40 | 0.05 | 0.5 | 0.3 | Y | 0.5 | 0.08 |
| I-41 | 0.05 | 0.3 | 0.3 | Y | 0.5 | 0.05 |
| I-42 | 0.05 | 0.6 | 0.3 | Y | 0.5 | 0.05 |
| I-43 | 0.05 | 0.5 | 0.2 | Y | 0.5 | 0.05 |
| I-44 | 0.05 | 0.5 | 0.4 | Y | 0.5 | 0.05 |
| I-45 | 0.05 | 0.5 | 0.3 | Y | 0.4 | 0.05 |
| I-46 | 0.05 | 0.5 | 0.3 | Y | 0.6 | 0.05 |
| I-47 | 0.05 | 0.5 | 0.3 | Dy | 0.5 | 0.05 |
| I-48 | 0.05 | 0.5 | 0.3 | Ho | 0.5 | 0.05 |
| I-49 | 0.05 | 0.5 | 0.3 | Er | 0.5 | 0.05 |
| I-50 | 0.05 | 0.5 | 0.3 | Y | 0.5 | 0.02 |
| I-51 | 0.05 | 0.5 | 0.3 | Y | 0.5 | 0.05 |
| I-52 | 0.05 | 0.5 | 0.3 | Y | 0.5 | 0.08 |
| I-53 | 0.05 | 0.5 | 0.3 | Y | 0.5 | 0.05 |
| I-54 | 0.05 | 0.5 | 0.3 | Y | 0.5 | 0.05 |
| I-55 | 0.05 | 0.5 | 0.3 | Y | 0.5 | 0.05 |

* represents a sample outside the range in the invention.

TABLE 3

| Sample No. | Dielectric layer thickness μm | Average crystal grain diameter of crystal grains μm | XRD # | Curie temperature ° C. | Relative dielectric constant 1 Vrms | Relative dielectric constant ratio #2 | Dielectric loss 1 Vrms | Temperature characteristics #3 | High temperature load test #4 ○, X |
|---|---|---|---|---|---|---|---|---|---|
| * I-1 | 1 | 0.26 | ○ | 125 | 3200 | 1.4 | 9 | ○ | X |
| I-2 | 1 | 0.25 | ○ | 120 | 3500 | 1.5 | 10 | ○ | ○ |
| I-3 | 1 | 0.25 | ○ | 115 | 3520 | 1.5 | 10 | ○ | ○ |
| I-4 | 1 | 0.25 | ○ | 112 | 3540 | 1.6 | 10 | ○ | ○ |
| I-5 | 1 | 0.25 | ○ | 110 | 3600 | 1.7 | 11 | ○ | ○ |
| * I-6 | 1 | 0.25 | X | 106 | 3700 | 2.0 | 14 | ○ | ○ |
| * I-7 | 1 | 0.21 | ○ | 125 | 3620 | 1.5 | 9 | ○ | X |
| I-8 | 1 | 0.22 | ○ | 120 | 3600 | 1.5 | 10 | ○ | ○ |
| I-9 | 1 | 0.22 | ○ | 120 | 3540 | 1.5 | 10 | ○ | ○ |
| I-10 | 1 | 0.23 | ○ | 120 | 3530 | 1.5 | 10 | ○ | ○ |
| I-11 | 1 | 0.25 | ○ | 120 | 3480 | 1.5 | 10 | ○ | ○ |
| I-12 | 1 | 0.27 | ○ | 120 | 3410 | 1.6 | 10 | ○ | ○ |
| I-13 | 1 | 0.3 | ○ | 115 | 3310 | 1.7 | 12 | ○ | ○ |
| * I-14 | 1 | 0.32 | X | 110 | 3230 | 1.9 | 13 | ○ | ○ |
| * I-15 | 1 | 0.25 | ○ | 125 | 3600 | 1.6 | 10 | X | ○ |
| I-16 | 1 | 0.25 | ○ | 120 | 3550 | 1.5 | 10 | ○ | ○ |
| I-17 | 1 | 0.25 | ○ | 115 | 3540 | 1.5 | 10 | ○ | ○ |
| I-18 | 1 | 0.25 | ○ | 112 | 3460 | 1.6 | 10 | ○ | ○ |
| I-19 | 1 | 0.25 | ○ | 110 | 3380 | 1.5 | 10 | ○ | ○ |
| * I-20 | 1 | 0.25 | ○ | 100 | 3220 | 1.5 | 10 | ○ | ○ |
| * I-21 | 1 | 0.25 | ○ | 115 | 3600 | 1.6 | 10 | ○ | X |
| I-22 | 1 | 0.25 | ○ | 115 | 3550 | 1.5 | 10 | ○ | ○ |
| I-23 | 1 | 0.25 | ○ | 115 | 3550 | 1.5 | 10 | ○ | ○ |
| I-24 | 1 | 0.25 | ○ | 115 | 3400 | 1.5 | 10 | ○ | ○ |
| I-25 | 1 | 0.25 | ○ | 115 | 3300 | 1.5 | 10 | ○ | ○ |
| * I-26 | 1 | 0.25 | ○ | 115 | 2900 | 1.5 | 10 | ○ | ○ |

TABLE 3-continued

| Sample No. | Dielectric layer thickness μm | Average crystal grain diameter of crystal grains μm | XRD # | Curie temperature ° C. | Relative dielectric constant 1 Vrms | Relative dielectric constant ratio #2 | Dielectric loss 1 Vrms | Temperature characteristics #3 | High temperature load test #4 ○, X |
|---|---|---|---|---|---|---|---|---|---|
| * I-27 | 1 | 0.25 | ○ | 115 | 3550 | 1.6 | 11 | ○ | X |
| I-28 | 1 | 0.25 | ○ | 115 | 3540 | 1.5 | 10 | ○ | ○ |
| I-29 | 1 | 0.25 | ○ | 115 | 3540 | 1.5 | 10 | ○ | ○ |
| I-30 | 1 | 0.25 | ○ | 115 | 3410 | 1.5 | 10 | ○ | ○ |
| I-31 | 1 | 0.25 | ○ | 115 | 3320 | 1.5 | 10 | ○ | ○ |
| * I-32 | 1 | 0.25 | ○ | 115 | 3100 | 1.5 | 10 | ○ | ○ |
| I-33 | 1 | 0.25 | ○ | 115 | 3510 | 1.5 | 10 | ○ | ○ |
| I-34 | 1 | 0.25 | ○ | 115 | 3510 | 1.5 | 10 | ○ | ○ |
| I-35 | 1 | 0.25 | ○ | 115 | 3510 | 1.5 | 10 | ○ | ○ |
| I-36 | 1 | 0.26 | ○ | 115 | 3970 | 1.4 | 10 | ○ | ○ |
| I-37 | 1 | 0.26 | ○ | 115 | 3910 | 1.4 | 10 | ○ | ○ |
| I-38 | 1 | 0.26 | ○ | 115 | 3880 | 1.2 | 10 | ○ | ○ |
| I-39 | 1 | 0.26 | ○ | 115 | 3910 | 1.3 | 10 | ○ | ○ |
| I-40 | 1 | 0.26 | ○ | 115 | 3930 | 1.3 | 10 | ○ | ○ |
| I-41 | 1 | 0.26 | ○ | 116 | 3960 | 1.3 | 11 | ○ | ○ |
| I-42 | 1 | 0.26 | ○ | 113 | 3940 | 1.3 | 11 | ○ | ○ |
| I-43 | 1 | 0.26 | ○ | 115 | 3960 | 1.3 | 11 | ○ | ○ |
| I-44 | 1 | 0.26 | ○ | 115 | 3820 | 1.3 | 11 | ○ | ○ |
| I-45 | 1 | 0.26 | ○ | 115 | 3980 | 1.3 | 11 | ○ | ○ |
| I-46 | 1 | 0.26 | ○ | 115 | 3840 | 1.3 | 11 | ○ | ○ |
| I-47 | 1 | 0.26 | ○ | 115 | 3900 | 1.3 | 10 | ○ | ○ |
| I-48 | 1 | 0.26 | ○ | 115 | 3900 | 1.3 | 10 | ○ | ○ |
| I-49 | 1 | 0.26 | ○ | 115 | 3900 | 1.3 | 10 | ○ | ○ |
| I-50 | 2 | 0.26 | ○ | 115 | 3880 | 1.3 | 11 | ○ | ○ |
| I-51 | 2 | 0.26 | ○ | 115 | 3910 | 1.3 | 11 | ○ | ○ |
| I-52 | 2 | 0.26 | ○ | 115 | 3930 | 1.3 | 10 | ○ | ○ |
| I-53 | 1 | 0.2 | ○ | 115 | 3800 | 1.3 | 11.5 | ○ | ○ |
| I-54 | 1 | 0.23 | ○ | 115 | 3900 | 1.3 | 11 | ○ | ○ |
| I-55 | 1 | 0.28 | ○ | 115 | 4050 | 1.3 | 11 | ○ | ○ |

*: represents a sample outside the range in the invention.
: XRD refers to evaluation by X ray diffraction
: The case where the peak intensity (Ic) of a cubic crystal is larger than the peak intensity (It) of a tetragonal crystal is ○ and case where the peak intensity (Ic) of a cubic crystal is smaller than the peak intensity (It) of a tetragonal crystal is X.
2: Relative dielectric constant at AC voltage of 1 Vrms/Relative dielectric constant at AC voltage of 0.01 Vrms
3: The case where X6S is satisfied is ○ and the case where X6S is not satisfied is X.
4: The case where the conditions of 105° C., 6 V, and 1000 hours are satified is ○ and the case where the conditions of 105° C., 6 V, and 1000 hours are not satified is X.

As is apparent from the results of Tables 1 to 3, in the samples Nos. I-2 to 5, 8 to 13, 16 to 19, 22 to 25, 28 to 31, and 33 to 55 of the invention, the relative dielectric constant at room temperature (25° C.) was 3300 or more, the dielectric loss was 12% or lower, the temperature characteristics of relative dielectric constant satisfied X6S (the temperature change ratio of relative dielectric constant based on 25° C. was within ±22% at −55 to 105° C.), the relative dielectric constant when the AC voltage was 1 V was not more than 1.7 times the relative dielectric constant when the AC voltage was 0.01 V, and further no defects occurred in a high temperature load test (Temperature: 105° C., Voltage: 1.5 times the rated voltage, 1000 hours).

As the composition of the dielectric ceramics constituting the dielectric layer, in the samples Nos. I-36 to 55 containing 0.02 to 0.08 mol of vanadium in terms of $V_2O_5$, 0.3 to 0.6 mol of magnesium in terms of MgO, 0.2 to 0.4 mol of manganese in terms of MnO, 0.4 to 0.6 mol of at least one rare earth elements selected from yttrium, dysprosium, holmium, and erbium in terms of $RE_2O_3$, and 0.02 to 0.08 mol of terbium in terms of $Tb_4O_7$ with respect to 100 mol of titanium constituting barium titanate, the relative dielectric constant was 3800 or more and the relative dielectric constant when the AC voltage was 1 V was not more than 1.4 times the relative dielectric constant when the AC voltage was 0.01 V.

In the samples Nos. I-2 to 5, 8 to 12, 16 to 19, 22 to 25, 28 to 31, 33 to 52, 54, and 55 in the average crystal grain diameter of the crystal grains constituting the dielectric layer was in the range of 0.22 to 0.28 μm, the dielectric loss was 11% or lower.

In contrast, the samples Nos. I-1, 6, 7, 14, 15, 20, 21, 26, 27, and 32 that are outside the range in the invention did not satisfy any property such that the relative dielectric constant at room temperature (25° C.) was 3300 or more, the dielectric loss was 12% or lower, the temperature characteristics of relative dielectric constant satisfied X6S (the temperature change ratio of relative dielectric constant based on 25° C. is 22% at −55 to 105° C.), the dielectric constant when the AC voltage was 1 V was not more than 1.7 times the dielectric constant when the AC voltage was 0.01 V, and the life satisfied that no defects occurred in a high temperature load test of a temperature: 105° C., Voltage: 1.5 times the rated voltage, and 1000 hours or more.

Example II

A ceramic green sheet was obtained by mixing each raw material powder in the proportion shown in Table 7 in the same manner as in Example 1, except using BT powder having a specific surface area of 6 m²/g in place of the BT powder having a specific surface area of 4 m²/g, a capacitor main body compact was fired at 1130 to 1160° C. to produce a capacitor main body, and further a multilayer ceramic capacitor was produced. The obtained multilayer ceramic capacitor was evaluated in the same manner as in Example I.

However, the conditions of a high temperature load test were different from the conditions of Example I (Temperature: 105° C., Voltage: 6V, Test time: 1000 hours), and it was evaluated whether the multilayer ceramic capacitor satisfied the conditions of Temperature: 125° C., Voltage: 6 V, and Test time: 1000 hours.

The formulation composition and the firing temperature of each sample are shown in Table 4, the composition of each element in a sintered compact in terms of oxide is shown in Table 5, and the measurement results of the thickness of the dielectric layer after firing, the average crystal grain diameter, the peak intensity ratio of the cubic crystal and the tetragonal crystal by X ray diffraction, the properties (dielectric constant, dielectric loss, temperature characteristics of relative dielectric constant, and life in a high temperature load test) are shown in Table 6.

TABLE 4

| Sample No. | $V_2O_5$ Mol | MgO Mol | $MnCO_3$ Mol | $RE_2O_3$ Element | $RE_2O_3$ Mol | $Tb_4O_7$ Mol | Firing temperature ° C. |
|---|---|---|---|---|---|---|---|
| * II-1 | 0.1 | 0.5 | 0.3 | Y | 0.5 | 0 | 1130 |
| II-2 | 0.1 | 0.5 | 0.3 | Y | 0.5 | 0.05 | 1130 |
| II-3 | 0.1 | 0.5 | 0.3 | Y | 0.5 | 0.1 | 1130 |
| II-4 | 0.1 | 0.5 | 0.3 | Y | 0.5 | 0.15 | 1130 |
| II-5 | 0.1 | 0.5 | 0.3 | Y | 0.5 | 0.2 | 1130 |
| * II-6 | 0.1 | 0.5 | 0.3 | Y | 0.5 | 0.3 | 1130 |
| * II-7 | 0 | 0.5 | 0.3 | Y | 0.5 | 0.1 | 1130 |
| II-8 | 0.02 | 0.5 | 0.3 | Y | 0.5 | 0.1 | 1130 |
| II-9 | 0.05 | 0.5 | 0.3 | Y | 0.5 | 0.1 | 1130 |
| II-10 | 0.08 | 0.5 | 0.3 | Y | 0.5 | 0.1 | 1130 |
| II-11 | 0.12 | 0.5 | 0.3 | Y | 0.5 | 0.1 | 1130 |
| II-12 | 0.15 | 0.5 | 0.3 | Y | 0.5 | 0.1 | 1130 |
| II-13 | 0.2 | 0.5 | 0.3 | Y | 0.5 | 0.1 | 1130 |
| * II-14 | 0.3 | 0.5 | 0.3 | Y | 0.5 | 0.1 | 1130 |
| * II-15 | 0.1 | 0.1 | 0.3 | Y | 0.5 | 0.1 | 1130 |
| II-16 | 0.1 | 0.2 | 0.3 | Y | 0.5 | 0.1 | 1130 |
| II-17 | 0.1 | 0.3 | 0.3 | Y | 0.5 | 0.1 | 1130 |
| II-18 | 0.1 | 0.6 | 0.3 | Y | 0.5 | 0.1 | 1130 |
| II-19 | 0.1 | 0.8 | 0.3 | Y | 0.5 | 0.1 | 1130 |
| * II-20 | 0.1 | 1 | 0.3 | Y | 0.5 | 0.1 | 1130 |
| * II-21 | 0.1 | 0.5 | 0 | Y | 0.5 | 0.1 | 1130 |
| II-22 | 0.1 | 0.5 | 0.1 | Y | 0.5 | 0.1 | 1130 |
| II-23 | 0.1 | 0.5 | 0.2 | Y | 0.5 | 0.1 | 1130 |
| II-24 | 0.1 | 0.5 | 0.4 | Y | 0.5 | 0.1 | 1130 |
| II-25 | 0.1 | 0.5 | 0.5 | Y | 0.5 | 0.1 | 1130 |
| * II-26 | 0.1 | 0.5 | 0.6 | Y | 0.5 | 0.1 | 1130 |
| * II-27 | 0.1 | 0.5 | 0.3 | Y | 0.1 | 0.1 | 1130 |
| II-28 | 0.1 | 0.5 | 0.3 | Y | 0.3 | 0.1 | 1130 |
| II-29 | 0.1 | 0.5 | 0.3 | Y | 0.4 | 0.1 | 1130 |
| II-30 | 0.1 | 0.5 | 0.3 | Y | 0.6 | 0.1 | 1130 |
| II-31 | 0.1 | 0.5 | 0.3 | Y | 0.8 | 0.1 | 1130 |
| * II-32 | 0.1 | 0.5 | 0.3 | Y | 1 | 0.1 | 1130 |
| II-33 | 0.1 | 0.5 | 0.3 | Dy | 0.5 | 0.1 | 1130 |
| II-34 | 0.1 | 0.5 | 0.3 | Ho | 0.5 | 0.1 | 1130 |
| II-35 | 0.1 | 0.5 | 0.3 | Er | 0.5 | 0.1 | 1130 |
| II-36 | 0.02 | 0.5 | 0.3 | Y | 0.5 | 0.02 | 1130 |
| II-37 | 0.08 | 0.5 | 0.3 | Y | 0.5 | 0.08 | 1130 |
| II-38 | 0.05 | 0.5 | 0.3 | Y | 0.5 | 0.02 | 1130 |
| II-39 | 0.05 | 0.5 | 0.3 | Y | 0.5 | 0.05 | 1130 |
| II-40 | 0.05 | 0.5 | 0.3 | Y | 0.5 | 0.08 | 1130 |
| II-41 | 0.05 | 0.3 | 0.3 | Y | 0.5 | 0.05 | 1130 |
| II-42 | 0.05 | 0.6 | 0.3 | Y | 0.5 | 0.05 | 1130 |
| II-43 | 0.05 | 0.5 | 0.2 | Y | 0.5 | 0.05 | 1130 |
| II-44 | 0.05 | 0.5 | 0.4 | Y | 0.5 | 0.05 | 1130 |
| II-45 | 0.05 | 0.5 | 0.3 | Y | 0.4 | 0.05 | 1130 |
| II-46 | 0.05 | 0.5 | 0.3 | Y | 0.6 | 0.05 | 1130 |
| II-47 | 0.05 | 0.5 | 0.3 | Dy | 0.5 | 0.05 | 1130 |
| II-48 | 0.05 | 0.5 | 0.3 | Ho | 0.5 | 0.05 | 1130 |
| II-49 | 0.05 | 0.5 | 0.3 | Er | 0.5 | 0.05 | 1130 |
| II-50 | 0.05 | 0.5 | 0.3 | Y | 0.5 | 0.05 | 1120 |
| II-51 | 0.05 | 0.5 | 0.3 | Y | 0.5 | 0.05 | 1125 |
| II-52 | 0.05 | 0.5 | 0.3 | Y | 0.5 | 0.05 | 1135 |
| II-53 | 0.08 | 0.5 | 0.3 | Y | 0.5 | 0.1 | 1160 |

* represents a sample outside the range in the invention.

TABLE 5

| Sample No. | $V_2O_5$ Mol | MgO Mol | MnO Mol | $RE_2O_3$ Element | $RE_2O_3$ Mol | $Tb_4O_7$ Mol |
|---|---|---|---|---|---|---|
| * II-1 | 0.1 | 0.5 | 0.3 | Y | 0.5 | 0 |
| II-2 | 0.1 | 0.5 | 0.3 | Y | 0.5 | 0.05 |
| II-3 | 0.1 | 0.5 | 0.3 | Y | 0.5 | 0.1 |
| II-4 | 0.1 | 0.5 | 0.3 | Y | 0.5 | 0.15 |
| II-5 | 0.1 | 0.5 | 0.3 | Y | 0.5 | 0.2 |
| * II-6 | 0.1 | 0.5 | 0.3 | Y | 0.5 | 0.3 |
| * II-7 | 0 | 0.5 | 0.3 | Y | 0.5 | 0.1 |
| II-8 | 0.02 | 0.5 | 0.3 | Y | 0.5 | 0.1 |
| II-9 | 0.05 | 0.5 | 0.3 | Y | 0.5 | 0.1 |
| II-10 | 0.08 | 0.5 | 0.3 | Y | 0.5 | 0.1 |
| II-11 | 0.12 | 0.5 | 0.3 | Y | 0.5 | 0.1 |
| II-12 | 0.15 | 0.5 | 0.3 | Y | 0.5 | 0.1 |
| II-13 | 0.2 | 0.5 | 0.3 | Y | 0.5 | 0.1 |
| * II-14 | 0.3 | 0.5 | 0.3 | Y | 0.5 | 0.1 |
| * II-15 | 0.1 | 0.1 | 0.3 | Y | 0.5 | 0.1 |
| II-16 | 0.1 | 0.2 | 0.3 | Y | 0.5 | 0.1 |
| II-17 | 0.1 | 0.3 | 0.3 | Y | 0.5 | 0.1 |
| II-18 | 0.1 | 0.6 | 0.3 | Y | 0.5 | 0.1 |
| II-19 | 0.1 | 0.8 | 0.3 | Y | 0.5 | 0.1 |
| * II-20 | 0.1 | 1 | 0.3 | Y | 0.5 | 0.1 |
| * II-21 | 0.1 | 0.5 | 0 | Y | 0.5 | 0.1 |
| II-22 | 0.1 | 0.5 | 0.1 | Y | 0.5 | 0.1 |
| II-23 | 0.1 | 0.5 | 0.2 | Y | 0.5 | 0.1 |
| II-24 | 0.1 | 0.5 | 0.4 | Y | 0.5 | 0.1 |
| II-25 | 0.1 | 0.5 | 0.5 | Y | 0.5 | 0.1 |
| * II-26 | 0.1 | 0.5 | 0.6 | Y | 0.5 | 0.1 |
| * II-27 | 0.1 | 0.5 | 0.3 | Y | 0.1 | 0.1 |
| II-28 | 0.1 | 0.5 | 0.3 | Y | 0.3 | 0.1 |
| II-29 | 0.1 | 0.5 | 0.3 | Y | 0.4 | 0.1 |
| II-30 | 0.1 | 0.5 | 0.3 | Y | 0.6 | 0.1 |
| II-31 | 0.1 | 0.5 | 0.3 | Y | 0.8 | 0.1 |
| * II-32 | 0.1 | 0.5 | 0.3 | Y | 1 | 0.1 |
| II-33 | 0.1 | 0.5 | 0.3 | Dy | 0.5 | 0.1 |
| II-34 | 0.1 | 0.5 | 0.3 | Ho | 0.5 | 0.1 |
| II-35 | 0.1 | 0.5 | 0.3 | Er | 0.5 | 0.1 |
| II-36 | 0.02 | 0.5 | 0.3 | Y | 0.5 | 0.02 |
| II-37 | 0.08 | 0.5 | 0.3 | Y | 0.5 | 0.08 |
| II-38 | 0.05 | 0.5 | 0.3 | Y | 0.5 | 0.02 |
| II-39 | 0.05 | 0.5 | 0.3 | Y | 0.5 | 0.05 |
| II-40 | 0.05 | 0.5 | 0.3 | Y | 0.5 | 0.08 |
| II-41 | 0.05 | 0.3 | 0.3 | Y | 0.5 | 0.05 |
| II-42 | 0.05 | 0.6 | 0.3 | Y | 0.5 | 0.05 |
| II-43 | 0.05 | 0.5 | 0.2 | Y | 0.5 | 0.05 |
| II-44 | 0.05 | 0.5 | 0.4 | Y | 0.5 | 0.05 |
| II-45 | 0.05 | 0.5 | 0.3 | Y | 0.4 | 0.05 |
| II-46 | 0.05 | 0.5 | 0.3 | Y | 0.6 | 0.05 |
| II-47 | 0.05 | 0.5 | 0.3 | Dy | 0.5 | 0.05 |
| II-48 | 0.05 | 0.5 | 0.3 | Ho | 0.5 | 0.05 |
| II-49 | 0.05 | 0.5 | 0.3 | Er | 0.5 | 0.05 |
| II-50 | 0.05 | 0.5 | 0.3 | Y | 0.5 | 0.05 |
| II-51 | 0.05 | 0.5 | 0.3 | Y | 0.5 | 0.05 |
| II-52 | 0.05 | 0.5 | 0.3 | Y | 0.5 | 0.05 |
| II-53 | 0.08 | 0.5 | 0.3 | Y | 0.5 | 0.1 |

* represents a sample outside the range in the invention.

TABLE 6

| Sample No. | Dielectric layer thickness μm | Average crystal grain diameter of crystal grains μm | XRD # — | Curie temperature °C. | Relative dielectric constant 1 Vrms | Relative dielectric constant ratio #2 | Dielectric loss 1 Vrms | Temperature characteristics #3 — | High temperature load test #4 ○, X |
|---|---|---|---|---|---|---|---|---|---|
| * II-1 | 0.7 | 0.17 | ○ | 125 | 3170 | 1.4 | 10.5 | ○ | X |
| II-2 | 0.7 | 0.16 | ○ | 120 | 3470 | 1.5 | 11.5 | ○ | ○ |
| II-3 | 0.7 | 0.16 | ○ | 115 | 3490 | 1.5 | 11.5 | ○ | ○ |
| II-4 | 0.7 | 0.16 | ○ | 112 | 3510 | 1.6 | 11.5 | ○ | ○ |
| II-5 | 0.7 | 0.16 | ○ | 110 | 3570 | 1.7 | 12 | ○ | ○ |
| * II-6 | 0.7 | 0.16 | X | 106 | 3670 | 2.0 | 15.5 | ○ | ○ |
| * II-7 | 0.7 | 0.12 | ○ | 125 | 3590 | 1.5 | 10.5 | ○ | X |
| II-8 | 0.7 | 0.13 | ○ | 120 | 3570 | 1.5 | 11.5 | ○ | ○ |
| II-9 | 0.7 | 0.13 | ○ | 120 | 3510 | 1.5 | 11.5 | ○ | ○ |
| II-10 | 0.7 | 0.14 | ○ | 120 | 3500 | 1.5 | 11.5 | ○ | ○ |
| II-11 | 0.7 | 0.16 | ○ | 120 | 3450 | 1.5 | 11.5 | ○ | ○ |
| II-12 | 0.7 | 0.18 | ○ | 120 | 3380 | 1.6 | 11.5 | ○ | ○ |
| II-13 | 0.7 | 0.19 | ○ | 115 | 3300 | 1.7 | 13.5 | ○ | ○ |
| * II-14 | 0.7 | 0.23 | X | 110 | 3200 | 1.9 | 14.5 | ○ | ○ |
| * II-15 | 0.7 | 0.16 | ○ | 125 | 3570 | 1.6 | 11.5 | X | ○ |
| II-16 | 0.7 | 0.16 | ○ | 120 | 3520 | 1.5 | 11.5 | ○ | ○ |
| II-17 | 0.7 | 0.16 | ○ | 115 | 3510 | 1.5 | 11.5 | ○ | ○ |
| II-18 | 0.7 | 0.16 | ○ | 112 | 3430 | 1.6 | 11.5 | ○ | ○ |
| II-19 | 0.7 | 0.16 | ○ | 110 | 3350 | 1.5 | 11.5 | ○ | ○ |
| * II-20 | 0.7 | 0.16 | ○ | 100 | 3190 | 1.5 | 11.5 | ○ | ○ |
| * II-21 | 0.7 | 0.16 | ○ | 115 | 3570 | 1.6 | 11.5 | ○ | X |
| II-22 | 0.7 | 0.16 | ○ | 115 | 3520 | 1.5 | 11.5 | ○ | ○ |
| II-23 | 0.7 | 0.16 | ○ | 115 | 3520 | 1.5 | 11.5 | ○ | ○ |
| II-24 | 0.7 | 0.16 | ○ | 115 | 3370 | 1.5 | 11.5 | ○ | ○ |
| II-25 | 0.7 | 0.16 | ○ | 115 | 3300 | 1.5 | 11.5 | ○ | ○ |
| * II-26 | 0.7 | 0.16 | ○ | 115 | 2870 | 1.5 | 11.5 | ○ | ○ |
| * II-27 | 0.7 | 0.16 | ○ | 115 | 3520 | 1.6 | 12.5 | ○ | X |
| II-28 | 0.7 | 0.16 | ○ | 115 | 3510 | 1.5 | 11.5 | ○ | ○ |
| II-29 | 0.7 | 0.16 | ○ | 115 | 3510 | 1.5 | 11.5 | ○ | ○ |
| II-30 | 0.7 | 0.16 | ○ | 115 | 3380 | 1.5 | 11.5 | ○ | ○ |
| II-31 | 0.7 | 0.16 | ○ | 115 | 3300 | 1.5 | 11.5 | ○ | ○ |
| * II-32 | 0.7 | 0.16 | ○ | 115 | 3070 | 1.5 | 11.5 | ○ | ○ |
| II-33 | 0.7 | 0.16 | ○ | 115 | 3480 | 1.5 | 11.5 | ○ | ○ |
| II-34 | 0.7 | 0.16 | ○ | 115 | 3480 | 1.5 | 11.5 | ○ | ○ |
| II-35 | 0.7 | 0.16 | ○ | 115 | 3480 | 1.5 | 11.5 | ○ | ○ |
| II-36 | 0.7 | 0.17 | ○ | 115 | 3940 | 1.4 | 11.5 | ○ | ○ |
| II-37 | 0.7 | 0.17 | ○ | 115 | 3880 | 1.4 | 11.5 | ○ | ○ |
| II-38 | 0.7 | 0.17 | ○ | 115 | 3850 | 1.2 | 11.5 | ○ | ○ |
| II-39 | 0.7 | 0.17 | ○ | 115 | 3880 | 1.3 | 11.5 | ○ | ○ |
| II-40 | 0.7 | 0.17 | ○ | 115 | 3900 | 1.3 | 11.5 | ○ | ○ |
| II-41 | 0.7 | 0.17 | ○ | 116 | 3930 | 1.3 | 12 | ○ | ○ |
| II-42 | 0.7 | 0.17 | ○ | 113 | 3910 | 1.3 | 12 | ○ | ○ |
| II-43 | 0.7 | 0.17 | ○ | 115 | 3930 | 1.3 | 12 | ○ | ○ |
| II-44 | 0.7 | 0.17 | ○ | 115 | 3790 | 1.3 | 12 | ○ | ○ |
| II-45 | 0.7 | 0.17 | ○ | 115 | 3950 | 1.3 | 12 | ○ | ○ |
| II-46 | 0.7 | 0.17 | ○ | 115 | 3810 | 1.3 | 12 | ○ | ○ |
| II-47 | 0.7 | 0.17 | ○ | 115 | 3870 | 1.3 | 11.5 | ○ | ○ |
| II-48 | 0.7 | 0.17 | ○ | 115 | 3870 | 1.3 | 11.5 | ○ | ○ |
| II-49 | 0.7 | 0.17 | ○ | 115 | 3870 | 1.3 | 11.5 | ○ | ○ |
| II-50 | 0.7 | 0.11 | ○ | 115 | 3770 | 1.3 | 12 | ○ | ○ |
| II-51 | 0.7 | 0.14 | ○ | 115 | 3870 | 1.3 | 11.8 | ○ | ○ |
| II-52 | 0.7 | 0.19 | ○ | 115 | 4020 | 1.3 | 11.8 | ○ | ○ |
| II-53 | 0.7 | 0.2 | ○ | 120 | 3800 | 1.5 | 12 | ○ | X |

*: represents a sample outside the range in the invention.
: XRD refers to evaluation by X ray diffraction
: The case where the peak intensity (Ic) of a cubic crystal is larger than the peak intensity (It) of a tetragonal crystal is ○ and case where the peak intensity (Ic) of a cubic crystal is smaller than the peak intensity (It) of a tetragonal crystal is X.
2: Relative dielectric constant at AC voltage of 1 Vrms/Relative dielectric constant at AC voltage of 0.01 Vrms
3: The case where X6S is satisfied is ○ and the case where X6S is not satisfied is X.
4: The case where the conditions of 125° C., 6 V, and 1000 hours are satisfied is ○ and the case where the conditions of 125° C., 6 V, and 1000 hours are not satisfied is X.

As is apparent from the results of Table 6, in the samples Nos. II-2 to 5, 8 to 13, 16 to 19, 22 to 25, 28 to 31, and 33 to 52 of the invention, the relative dielectric constant at room temperature (25° C.) was 3300 or more, the dielectric loss was 12% or lower, the temperature characteristics of relative dielectric constant satisfied X6S (the temperature change ratio of relative dielectric constant based on 25° C. was within ±22% at −55 to 105° C.), the relative dielectric constant when the AC voltage was 1 V was not more than 1.7 times the dielectric constant when the AC voltage was 0.01 V, and further no defects occurred in a high temperature load test (Temperature: 125° C., Voltage: 1.5 times the rated voltage, 1000 hours). As a result, it is found that when the average crystal grain diameter of the crystal grains is made small (0.13 to 0.19 μm), the high temperature load properties are improved.

In contrast, in the samples Nos. II-1, 7, and 28 that do not satisfy the high temperature load characteristics, the blended amount of any of the raw materials do not satisfy the range in the invention. Thus, even when the average crystal grain diameter of the crystal grains is in the range of 0.13 to 0.19 μm, the samples do not satisfy the high temperature load characteristics.

In the sample No. II-53, the average crystal grain diameter of the crystal grains exceeded 0.19 μm. Thus, the high temperature load characteristics at 105° C. were satisfied but the high temperature load test characteristics at 125° C. were not satisfied.

The invention claimed is:

1. A multilayer ceramic capacitor, comprising:
   (i) dielectric layers containing dielectric ceramics containing crystal grains containing barium titanate as the main ingredients and containing magnesium, vanadium, manganese, terbium, and at least one rare earth element (RE) selected from yttrium, dysprosium, holmium, and erbium; and
   (ii) internal electrode layers,
   the dielectric layers and the internal electrode layers being alternately laminated,
   the dielectric ceramics containing, with respect to 100 mol of titanium constituting the barium titanate, 0.02 to 0.2 mol of vanadium in terms of $V_2O_5$, 0.2 to 0.8 mol of magnesium in terms of MgO, 0.1 to 0.5 mol of manganese in terms of MnO, 0.3 to 0.8 mol of the rare earth element (RE) in terms of $RE_2O_3$, and 0.02 to 0.2 mol of terbium in terms of $Tb_4O_7$, and
   in the X ray diffraction chart of the dielectric ceramics, the diffraction intensity at an angle of the diffraction peak of the (200) plane showing a cubic barium titanate being larger than the diffraction intensity at an angle of the diffraction peak of the (002) plane showing a tetragonal barium titanate and the curie temperature being 110 to 120° C.

2. The multilayer ceramic capacitor according to claim 1, wherein the dielectric ceramics contains, with respect to 100 mol of titanium constituting the barium titanate, 0.02 to 0.08 mol of vanadium in terms of $V_2O_5$, 0.3 to 0.6 mol of magnesium in terms of MgO, 0.2 to 0.4 mol of manganese in terms of MnO, 0.4 to 0.6mol of the rare earth element (RE) in terms of $RE_2O_3$, and 0.02 to 0.08 mol of terbium in terms of $Tb_4O_7$.

3. The multilayer ceramic capacitor according to claim 1, wherein the average crystal grain diameter of the crystal grains is 0.22 to 0.28 μm.

4. The multilayer ceramic capacitor according to claim 1, wherein the average crystal grain diameter of the crystal grains is 0.13 to 0.19 μm.

* * * * *